June 17, 1930.   M. MADSEN   1,764,327
BATCH BOX
Filed July 11, 1928   3 Sheets-Sheet 1

Inventor
Martin Madsen
By Fred W. Davis
Attorney

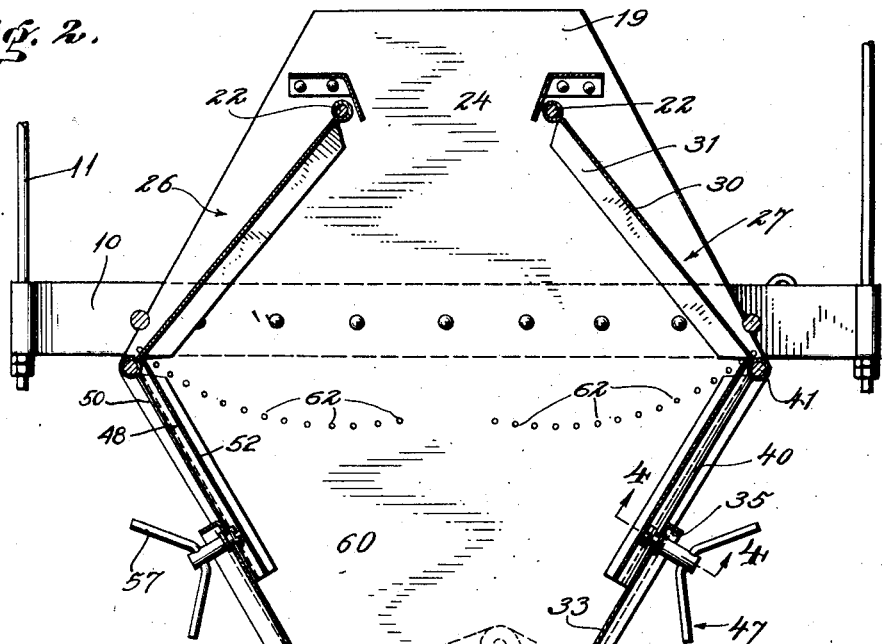
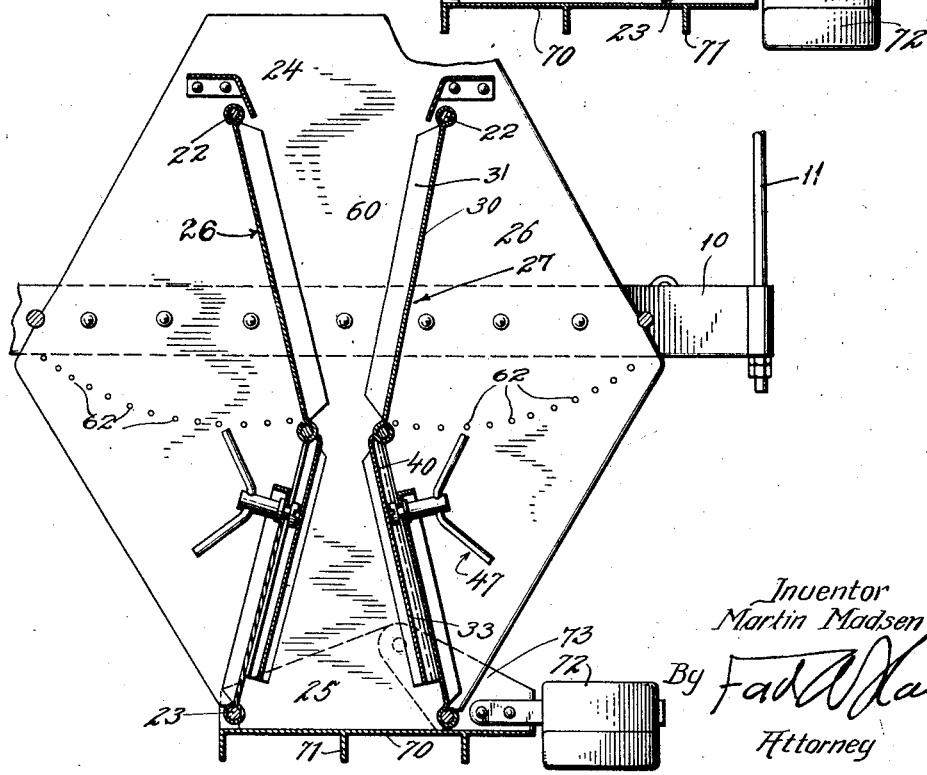

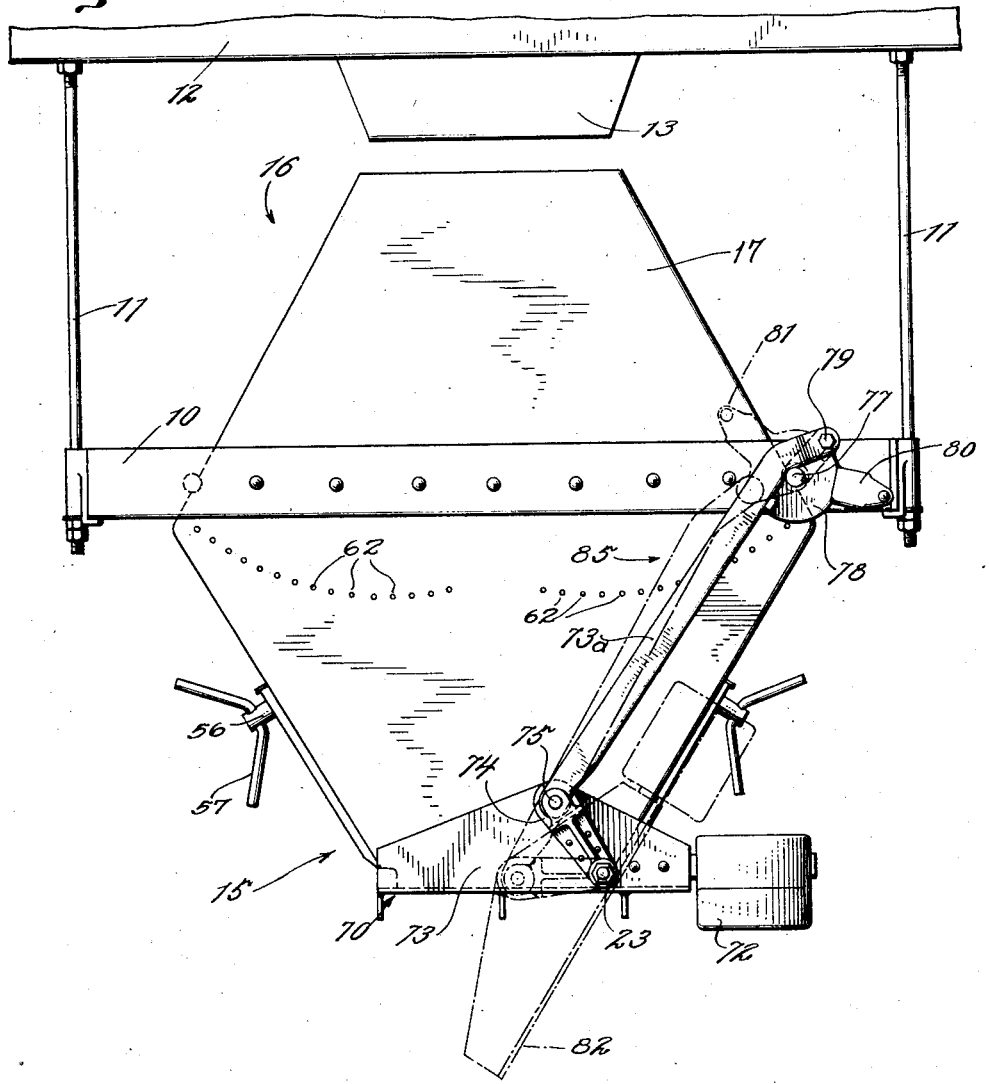

Patented June 17, 1930

1,764,327

UNITED STATES PATENT OFFICE

MARTIN MADSEN, OF HUNTINGTON PARK, CALIFORNIA, ASSIGNOR TO MADSEN IRON WORKS, OF HUNTINGTON PARK, CALIFORNIA, A CORPORATION OF CALIFORNIA

BATCH BOX

Application filed July 11, 1928. Serial No. 291,783.

My invention relates to measuring devices, and more particularly to a batch-box for measuring sand, rock, etc. It is in the latter capacity that I shall particularly describe my invention without in any way limiting myself to this use.

Sand and rock are usually stored in elevated bins under which a truck or other vehicle may be driven to be loaded. It is desirable to accurately measure the amount of material discharged into the vehicle, this measurement being usually one of volume, although weight measurements may also be used by suitable auxiliary apparatus attached to my invention. This measurement may be accomplished by discharging the material into a batch-box where the volume and weight may be measured and from whence the material may be discharged into the vehicle. Due to the different capacities of different vehicles, and also to the large range of amounts of material desired by different customers in different orders, it is desirable to have a batch-box of variable volume.

It is an object of my invention to provide a batch-box, the volume of which is readily variable.

Another object of my invention is to provide a batch-box having intake and outlet openings which are of constant size irrespective of the volume of the batch-box.

These objects I accomplish by pivoting one or more adjustable side-structures to a pair of end-plates, this side-structure being formed of primary and secondary plates pivoted relative to the end-plates these primary and secondary plates being connected by a tertiary plate pivoted to one of these plates.

It is an object of my invention to provide a batch-box having a pair of end-plates to which an adjustable side-structure is pivoted.

Another object of my invention is to provide a batch-box which will not clog or jam to prevent the adjustment thereof, and which will entirely fill with material, leaving no vacant spaces therein.

In delivering aggregates for use in mixing concrete, it is desirable to load the vehicle with volumes of different aggregates in proportion to the mixture desired, so that no proportioning is required after the material reaches the job. I have found it extremely desirable to mount two or more of my batch-boxes side by side, these boxes being filled from different bins containing the different aggregates. By varying the volume of each batch-box any desired proportion of aggregate can be discharged into a single vehicle.

In this capacity I have found it desirable to have the discharge openings of all of the batch-boxes closed by the same door so that the contents thereof may be simultaneously dumped into a vehicle when this door is opened.

It is an object of my invention to provide a plurality of batch-boxes, each connected to a bin containing an aggregate different from aggregates in the other bins, these batch-boxes being adjustable to allow any proportion of the different aggregates to be discharged.

Still a further object of my invention is to provide a plurality of batch-boxes, the discharge opening of these being closed by a single door.

Another object of my invention is to provide a novel form of door and locking mechanism therefor.

Referring to the drawings in which I illustrate a preferred embodiment of my invention, Fig. 1 is a side view of my invention.

Fig. 2 is a sectional view taken on the line 2—2 of Fig. 1, and illustrating my batch-box in such a position as to have a maximum volume.

Fig. 3 is a view similar to Fig. 2 illustrating my batch-box in such a position as to have a minimum volume.

Fig. 5 is an end view of the apparatus shown in Fig. 1.

Figure 1:
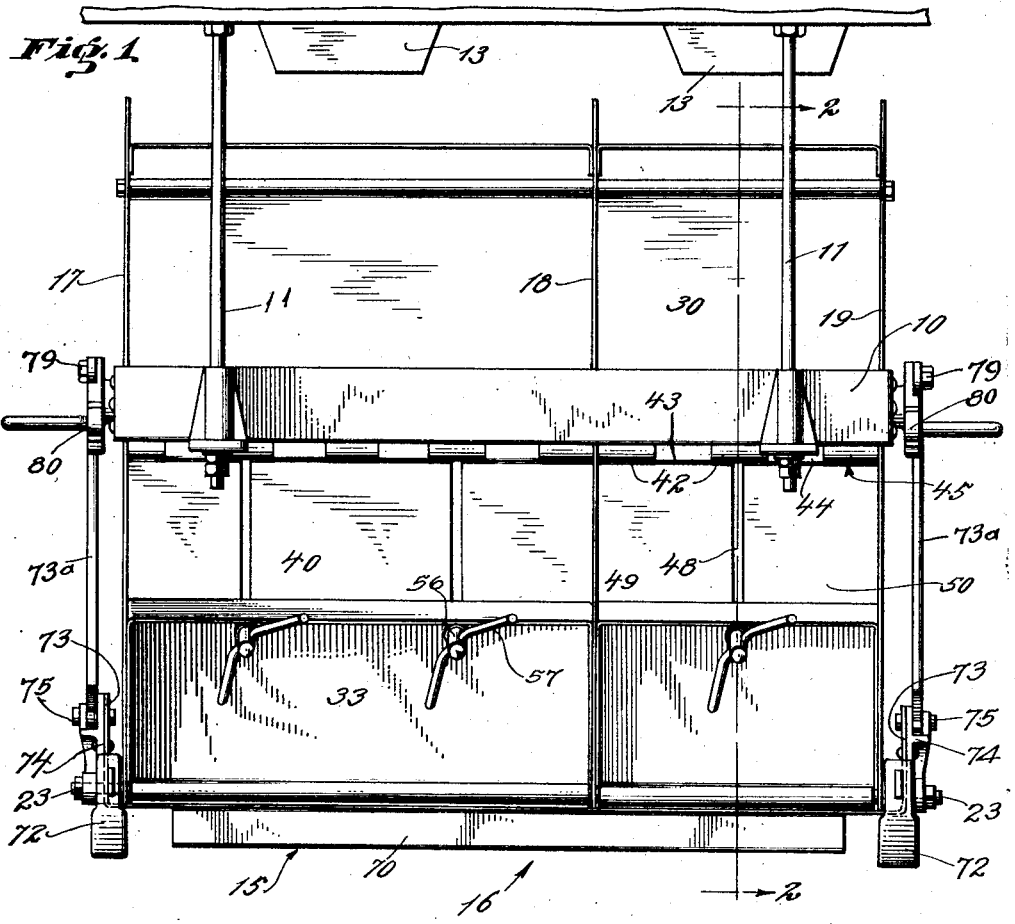

Referring particularly to Figs. 1 and 5, I illustrate a frame structure 10 which is supported by any suitable means, such as bars 11 extending upward and secured to a bin structure 12 which is adapted to store a number of different aggregates, such as different grades of rock and sand. Each of the bins in the bin structure is adapted to discharge its aggregate through its individual hopper 13. Two hoppers have been shown for the purpose of illustration but it should be understood that any number of these hoppers may be utilized.

A batch-box 15 of my invention is adapted to be positioned below each hopper 13, these batch-boxes cooperating to form a measuring device 16 of my invention which is carried by the frame structure 10 in any suitable manner.

Referring particularly to Fig. 1, I illustrate two batch-boxes 15 formed by primary, secondary and tertiary end-plates 17, 18, and 19, respectively. A primary batch-box is formed between the plates 17 and 18, while a secondary one is formed between the plates 18 and 19, as will be apparent hereinafter. These end-plates are hexagonal in form, as best illustrated in Figs. 2, 3, and 5. The two batch-boxes illustrated in Fig. 1 are identical with the exception that the primary one between the plates 17 and 18 is of a greater capacity than the secondary one between the plates 18 and 19 and has a duplication of certain parts. A detailed description of the latter will therefore suffice for both.

Extending through the end-plates 17, 18, and 19 and secured thereto are primary and secondary pairs of rods 22 and 23. The rods 22 are horizontally lined and spaced a distance apart to form an inlet opening 24, while the rods 23 are similarly disposed near the lower end of the end-plates and define an outlet opening 25 therebetween. The rods 22 and 23 form a means for pivoting primary and secondary side-structures 26 and 27 to the end-plates. A description of one of these side-structures will suffice to clearly explain my invention, inasmuch as these side-structures are identical.

Referring particularly to Figs. 2 and 3, the side-structure 27 comprises a primary side-plate 30, the upper end of which is bent around the rod 22 so that the plate 30 may be pivoted thereon. The ends of the side-plate 30 are bent inward to form extensions 31 which lie immediately adjacent, and preferably in contact with, the end-plates 18 and 19 so that the primary side-plate 30 extends between these plates.

Similarly, a secondary side-plate 33 is pivoted to each rod 23, the ends of this side-plate being bent outward to form extensions 34 lying adjacent the end-plates 18 and 19. The free end of the secondary side-plate 33 is bent to form a rib 35, this rib preventing any excessive bending of the secondary side-plate 33. It should be noted that the free end of the secondary side-plate 33 lies a distance from the free end of the primary side-plate 30.

Adapted to close this space between the primary and secondary side-plates is a tertiary plate 40 which is pivotally mounted on a rod 41 carried by the free end of the primary side-plate 30. The method of pivotally connecting the plates 30 and 40 may best be understood by reference to Fig. 1 which illustrates the free end of the plate 30 as having alternate tongues 42 and grooves 43, these tongues being bent around the rod 41 in a manner to securely hold this rod. Similarly, the upper end of the tertiary side-plate 40 has alternate tongues 44 and grooves 45, the tongues 44 being adapted to extend into the grooves 43 of the plate 30 and to be bent around the rod 41, while the grooves 45 receive the tongues 42 of the plate 30. The plates 30 and 40 are thus pivotally connected together and inter-lock one with the other through their respective tongues and grooves.

Figure 4:
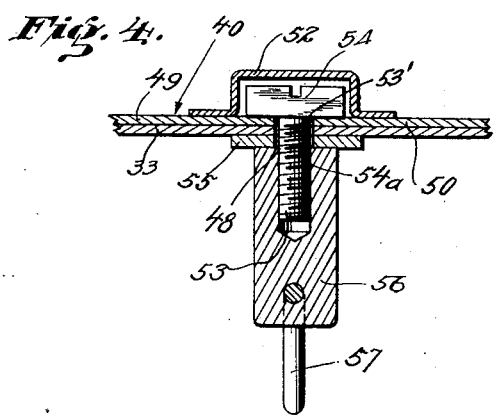
Fig. 4 is a sectional view taken on the line 4—4 of Fig. 2.

The free end of the tertiary plate 40 may be pivoted around the rod 41 and may be made to come into surface contact with the secondary side-plate 33 in a manner best indicated in Figs. 2 and 3. These two plates are adapted to be clamped together by clamping means 47, best illustrated in Figs. 2, 3, and 4. Formed completely through each tertiary side-plate 40 is a channel 48. In fact, the plate 40 is made up of a pair of auxiliary plates 49 and 50 which are secured together by a cover-plate 52, this cover-plate being attached to the auxiliary plates 49 and 50 by any suitable means, such as riveting or welding. The channel 48 is formed between adjacent edges of the auxiliary plates 49 and 50.

Adapted to slide along the channel 48 is a bolt 53 having a square head 53' adapted to slide inside the coverplate 52 and to be held from rotation by this plate. The bolt 53 extends through a hole 54 in the secondary side-plate 33 and has a washer 55 therearound. A nut 56 is adapted to be threadedly received by the bolt 53, this nut being actuated by handles 57 so as to clamp the plates 33 and 40 firmly together.

If the nut 56 is loosened, it should be clear that the rod 41 may swing around the axis of the rod 22, thus causing the plates 33 and 40 to slide relative to each other, and thus moving the side-structure 27 from a position shown in Fig. 2 into a position shown in Fig. 3, during which movement the volume of a batch-chamber 60 formed between the two side-structures 26 and 27 decreases from a maximum to a minimum. Any intermediate volume of the batch-chamber 60 may be secured by clamping the side structures 26 and 27 in positions intermediate those shown in Figs. 2 and 3.

In order to indicate to the operator the exact volume of the batch-chamber 60 at all times, I provide a suitable indicia on the end-plates 17 and 19 for indicating the volume of this chamber. This indicia is best shown in Figs. 2, 3, and 5 and comprises a series of holes 62 drilled through the end-plate concentric with the axis of the rod 22. These holes are so calibrated that they read in units of cubical content.

The operator places a pin through the desired hole in the series of holes utilized by the primary side-structure 26, and places a similar pin through a corresponding hole of the series used by the secondary side-structure 27. The nuts 56 are loosened and the primary side-plates 30 are swung outward around the rods 22 until they contact their respective pins, it being understood that these pins are of sufficient length to extend through the end-plate 19 and into the path of the side-plates 30. The nuts 56 are then tightened.

Pivoted on the ends of the rod 23 of the side-structure 27 is a door 70 of my invention. It should be clear from a reference to Fig. 1 that this door extends across both batch-boxes 15, and when in a closed position is adapted to lie immediately adjacent both rods 23 so as to prevent any escape of material from the batch-chamber 60. Reinforcing ribs 71 extend longitudinally across the door 70, this door being normally counterbalanced by a weight 72 so that when no material is in the batch-chamber 60, the door will freely pivot about the rod 23.

As best shown in Fig. 5, the door 70 has end-plates 73 to which a pivot-structure 74 is bolted. A pin 75 is carried by this structure and is journalled in a connecting-rod 73$^a$. One pivot-structure and attached connecting-rod is positioned on each end of the measuring device 16 of my invention.

Journalled in the frame-structure 10 is a locking-shaft 77, at each end of which is mounted a crank member 78. This member may be in the form of a simple crank or in the form of a disc, as illustrated in Fig. 5, and carries a pin 79 which is journalled in the upper end of the connecting-rod 73$^a$. The upper end of this connecting-rod is bent, as best illustrated in Fig. 5, and is of such a length that the door 70 is moved into closed position relative to the outlet opening 25 when the axes of the pins 75 and 79 are in alignment with the axis of the locking-shaft 77, at which time the connecting-rod 73$^a$ bears against the locking-shaft 77 in a manner to prevent a further rotation of the crank member 78. This crank member may be conveniently turned by means of a manually operable handle 80 extending therefrom.

When the crank member 78 is moved from a position shown in full lines in Fig. 5 into a position shown by dotted lines 81, the door 70 will move from a closed into an open position, this open position being indicated by dotted lines 82 of this figure. Such a movement is comparatively easy, and it should be clear that when the door 70 is in a closed position the connecting-rod 73$^a$ and the crank member 78 will securely hold this door in this position, these members cooperating to form a self-locking door-mechanism 85. When, however, it is desired to dump the contents of the batch-chamber 60, it is only necessary to move the handle 80 a very slight distance so that the axes of the pins 75 and 79 are disaligned with the axis of the locking-shaft 77, at which time the weight of the material in the batch-chamber forces the door into open position.

It is an important feature of my invention that the size of the inlet and outlet openings is always constant irrespective of the particular volume to which the batch-box has been set. Furthermore, there is no danger of any material becoming clogged in the batch-chamber.

I prefer to make one of the batch-boxes 15 larger than the other, the larger batch-box being used to proportion the coarse aggregate, such as rock, while the smaller batch-box is used to proportion the sand. Inasmuch as these batch-boxes are individually adjustable, it is possible to obtain any proportion between the sand and rock. Both the sand and rock will simultaneously dump when the crank member 78 on either end of the locking-shaft 77 is operated.

While I have described my invention as having side-structures 26 and 27 which are both adjustable, it should be understood that my invention is not limited to the dual use of such structures, inasmuch as a stationary side-structure might be substituted for one and the other side-structure used for varying the volume of the batch-chamber 60.

I claim as my invention:

1. In a batch-box, the combination of: a pair of end members; a primary side-structure extending between said end members; and a secondary side-structure comprising vertically adjacent plates extending between said end members with their respective outer edges pivotally secured to said side members, the free inner edges of said plates being hingedly united.

2. In a batch-box, the combination of: a pair of end members; a primary side-structure extending between said end members; primary and secondary rods extending between said end members; primary and secondary side-plates pivotally mounted on said rods; and a tertiary plate pivoted to said primary side-plate and extending adjacent said secondary side-plate.

3. In a batch-box, the combination of: a pair of end members; a primary side-structure extending between said end members;

primary and secondary rods extending between said end members; primary and secondary side-plates pivotally mounted on said rods; a tertiary plate pivoted to said primary side-plate and extending adjacent said secondary side-plate; and means for clamping said tertiary plate to said secondary side-plate.

4. A combination as defined in claim 3 including indicia for indicating the volume of said batch-box.

5. A combination as defined in claim 3 including holes in one of said side-plates adapted to receive a pin against which one of said plates may bear prior to tightening said clamping means, said holes comprising indicia for indicating the cubical content of said batch-box.

6. In a batch-box, the combination of: a pair of end members; a primary side-structure extending between said end members; primary and secondary rods extending between said end members; primary and secondary side-plates pivotally mounted on said rods; a tertiary plate pivoted to said primary side-plate and extending adjacent said secondary side-plate, said tertiary plate having a channel therein; a bolt adapted to slide along said channel and extend through said secondary side-plate; and a nut threaded on said bolt to clamp said tertiary plate and said secondary side-plate together.

7. A combination as defined in claim 6 in which said channel is covered by a cover plate.

8. A combination as defined in claim 2 in which said rods are spaced from said primary side-structure to form inlet and outlet openings of said batch-box, and including a door extending across said outlet opening when in a closed position.

9. A combination as defined in claim 2 in which said rods are spaced from said primary side-structure to form inlet and outlet openings of said batch-box, and including a door pivoted to said secondary rod.

10. A combination as defined in claim 2 in which said rods are spaced from said primary side-structure to form inlet and outlet openings of said batch-box, and including a door pivoted to said secondary rod and also including self-locking means for said door to hold it in closing relationship with said outlet opening.

11. A combination as defined in claim 1 in which said primary side-structure is similar in structure to said secondary side-structures so that said side-structures cooperate to determine the volume of said batch-box.

12. In a batch-box structure, the combination of: primary, secondary and tertiary end-plates; adjustable side-plates extending between said end-plates to form a primary batch chamber between said primary and said secondary end-plates, and cooperating to form a secondary batch-chamber between said secondary and tertiary end-plates, said side-plates being adjustable to vary the volume of said batch-chambers; and a door extending across the outlet openings of both of said batch-chambers to simultaneously control the discharge therefrom.

13. A combination as defined in claim 1 in which one of said plates is formed of two sections extensibly united.

14. A combination as defined in claim 1 in which one of said plates is formed of two extensibly united sections and is provided with means for securing said sections together so as to prevent movement of said side structure.

In testimony whereof, I have hereunto set my hand at Los Angeles, California, this 6th day of July, 1928.

MARTIN MADSEN.